(12) United States Patent
Li et al.

(10) Patent No.: US 8,447,317 B2
(45) Date of Patent: May 21, 2013

(54) METHOD AND ARRANGEMENT IN A WIRELESS COMMUNICATION SYSTEM

(75) Inventors: Shaohua Li, Beijing (CN); Zhiheng Guo, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/383,328

(22) PCT Filed: Dec. 9, 2010

(86) PCT No.: PCT/CN2010/001999
§ 371 (c)(1),
(2), (4) Date: Jan. 10, 2012

(87) PCT Pub. No.: WO2012/075609
PCT Pub. Date: Jun. 14, 2012

(65) Prior Publication Data
US 2012/0190377 A1    Jul. 26, 2012

(51) Int. Cl.
*H04W 4/00* (2009.01)
(52) U.S. Cl.
USPC .................................. 455/452.1; 455/434
(58) Field of Classification Search
USPC ............... 455/434, 512, 452.1, 63.1, 450, 62, 455/437, 39, 455; 370/332, 333, 328, 310, 370/343; 701/48
See application file for complete search history.

(56) References Cited

U.S. PATENT DOCUMENTS

| | | | |
|---|---|---|---|
| 6,240,126 B1 * | 5/2001 | Ohashi et al. | 375/132 |
| 8,040,848 B2 * | 10/2011 | Uemura et al. | 370/329 |
| 2004/0037247 A1 * | 2/2004 | Ngo | 370/332 |
| 2009/0221286 A1 * | 9/2009 | Kim et al. | 455/434 |

* cited by examiner

*Primary Examiner* — Kiet Doan
(74) *Attorney, Agent, or Firm* — Myers Bigel Sibley & Sajovec, P.A

(57) ABSTRACT

Method and arrangement in a user equipment (120) for selecting a radio channel out of a plurality of candidate radio channels. The selected radio channel is to be utilized for receiving control information from a base station (110). The user equipment (120) and the base station (110) are comprised in a wireless communication system (100). The method comprises determining (302) a physical entity of a signal received from the base station (110) over a candidate radio channel, out of the plurality of candidate radio channels. If the determined physical entity fulfills a criterion, the associated candidate radio channel is prioritized (303) for a check sum check. The check sum check is performed (304) on data received over the prioritized candidate radio channel. If the check sum check is successful, the prioritized candidate radio channel is selected (305).

18 Claims, 7 Drawing Sheets

METHOD AND ARRANGEMENT IN A WIRELESS COMMUNICATION SYSTEM

CROSS REFERENCE TO RELATED APPLICATION

This application is a 35 U.S.C. §371 national stage application of PCT International Application No. PCT/CN2010/001999, filed on 9 Dec. 2010, the disclosure and content of which is incorporated by reference herein in its entirety.

TECHNICAL FIELD

The present disclosure relates to a method and an arrangement in a user equipment. In particular, it relates to the selection of a radio channel out of a plurality of candidate radio channels, which selected radio channel is to be utilized for receiving control information from a base station.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones or laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a base station, e.g. a Radio Base Station (RBS), which in some networks may be referred to as "eNB", "eNodeB", "NodeB" or "B node", depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. The base stations communicate over the air interface operating on radio frequencies with the user equipment units within range of the base stations.

In some radio access networks, several base stations may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be connected to a gateway e.g. a radio access gateway. The radio network controllers may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of UMTS and LTE. LTE is a technology for realizing high-speed packet-based communication that may reach high data rates both in the downlink and in the uplink, and is thought of as a next generation mobile communication system relative UMTS.

In the present context, the expression downlink is used for the transmission path from the base station to the user equipment. The expression uplink is used for the transmission path in the opposite direction i.e. from the user equipment to the base station.

In order to support high data rates, LTE allows for a system bandwidth of up to 20 MHz. LTE is also able to operate in different frequency bands and may operate in at least Frequency Division Duplex (FDD) and Time Division Duplex (TDD). The modulation technique or the transmission method used in LTE is known as Orthogonal Frequency Division Multiplexing (OFDM).

In LTE, there are multiple physical channels. They comprise e.g. Physical Downlink Control Channel (PDCCH), Physical Downlink Share Channel (PDSCH), Broadcast Channel (BCH), Physical Control Format Indicator Channel (PCFICH), and Physical Hybrid-ARQ Indicator Channel (PHICH). PDCCH channel carry the resource allocation, modulation and coding scheme (MCS), Hybrid Automatic Repeat Request (HARQ) information for PDSCH. In order to detect PDSCH, PDCCH must firstly be detected.

The control region for PDCCH consists of a set of Control Channel Element (CCE). Since the PDCCH location in the control region and the format is not explicitly signalled to the user equipment, then the user equipment has to monitor a set of PDCCH candidates for control information in every non-DRX (Discontinuous Reception) subframe, where monitoring implies attempting to decode each of the PDCCHs candidates in the set according to all the monitored Downlink Control Information (DCI) formats. For each PDCCH candidates, it has multiple possible CCE aggregation levels, i.e., 1, 2, 4 and 8 and carries two possible formats of DCI. The traditional way for PDCCH detection is given in FIG. 1.

After having received signals over PDCCH, such as e.g. signals representing Orthogonal Frequency-Division Multiplexing (OFDM) symbols, the user equipment may conduct channel estimation, Multiple-Input, Multiple-Output (MIMO) detection, demodulation and descrambling. After descrambling, one possible PDCCH candidate with one possible DCI format is assumed and user equipment attempt to decode it. With the decoded bits, Cyclic Redundancy Check (CRC) is demasked with Radio Network Temporary Identifier (RNTI) and further used to check the candidates validate or not.

CRC or polynomial code checksum is a hash function designed to detect accidental changes to raw computer data.

If the demasked CRC is correct, the assumed PDCCH candidates are valid PDCCH, and the assumed DCI format is the expected format. Otherwise, the assumption is fail, a new PDCCH candidate and new DCI format are assumed, and the procedure of decoding, demasking, CRC checking will be iterated, until the correct PDCCH candidate is detected and DCI information is extracted from the PDCCH candidate.

With the above procedure, a plurality of PDCCH candidates has to be processed in order to find the valid PDCCH, if it is not encountered by pure chance the first time.

If P-RNTI (paging RNTI), and SI-RNTI (System Information RNTI) are present in the same subframe with C-RNTI, more blind detection times are needed. It is a heavy burden for the user equipment for all the blind detection, in particular as hand-held user equipment normally has a limited power supply/battery capacity. In LTE, the parameters for PDSCH detection are carried on PDCCH in the same sub-frame of the PDSCH.

SUMMARY

It is therefore an object to obviate at least some of the above mentioned disadvantages and to improve the performance in a wireless communication system.

According to a first aspect, the object is achieved by a method in a user equipment. The method aims at selecting a radio channel out of a plurality of candidate radio channels. The selected radio channel is to be utilized for receiving control information from a base station. The user equipment and the base station are comprised in a wireless communication system. The method comprises determining a physical entity of a signal received from the base station over a candidate radio channel, out of the plurality of candidate radio channels. The candidate radio channel is prioritized for a check sum check, if the determined physical entity fulfils a criterion.

The check sum check is performed on data received over the prioritized candidate radio channel. If the check sum check is successful, the prioritized candidate radio channel is selected.

According to a second aspect, the object is achieved by an arrangement in a user equipment. The arrangement is capable of selecting a radio channel out of a plurality of candidate radio channels, which selected radio channel is to be utilized for receiving control information from a base station. The user equipment and the base station are comprised in a wireless communication system. The arrangement comprises a receiver. The receiver is configured to receive signals over a candidate radio channel from the base station. Further, the arrangement comprises a processing circuit. The processing circuit is configured to determine a physical entity of a signal received from the base station. The signal is received over a candidate radio channel, out of the plurality of candidate radio channels. The processing circuit is further configured to prioritize the candidate radio channel for a check sum check, if the determined physical entity fulfils a criterion. In addition, the processing circuit is additionally configured to perform the check sum check on data received over the prioritized candidate radio channel. Furthermore, the processing circuit is also configured to select the prioritized candidate radio channel, if the check sum check is successful.

Thanks to embodiments of the present methods and arrangements, a radio channel detection scheme is presented, wherein the valid radio channel may be selected out of a plurality of candidate radio channels. By filtering out candidate radio channels before performing substantial signal processing, the blind detection complexity may be reduced by eliminating some of the channel candidates and also reduce the MIMO detection load. Thereby may the valid radio channel be selected faster, and/or with less computation, leading to power savings of the user equipment. Furthermore, since PDCCH detection is prior to PDSCH detection, the time reduction of PDCCH detection may save much time for PDSCH detection. As a result, the data process latency of the downlink services may also be reduced. Thus is an improved performance within the wireless communication system achieved.

Other objects, advantages and novel features will become apparent from the following detailed description of embodiments of the present methods and arrangements.

BRIEF DESCRIPTION OF THE DRAWINGS

The methods and arrangements are described in more detail with reference to attached drawings illustrating exemplary embodiments in which.

DETAILED DESCRIPTION

Embodiments herein are defined as a method in a user equipment and an arrangement in a user equipment respectively, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
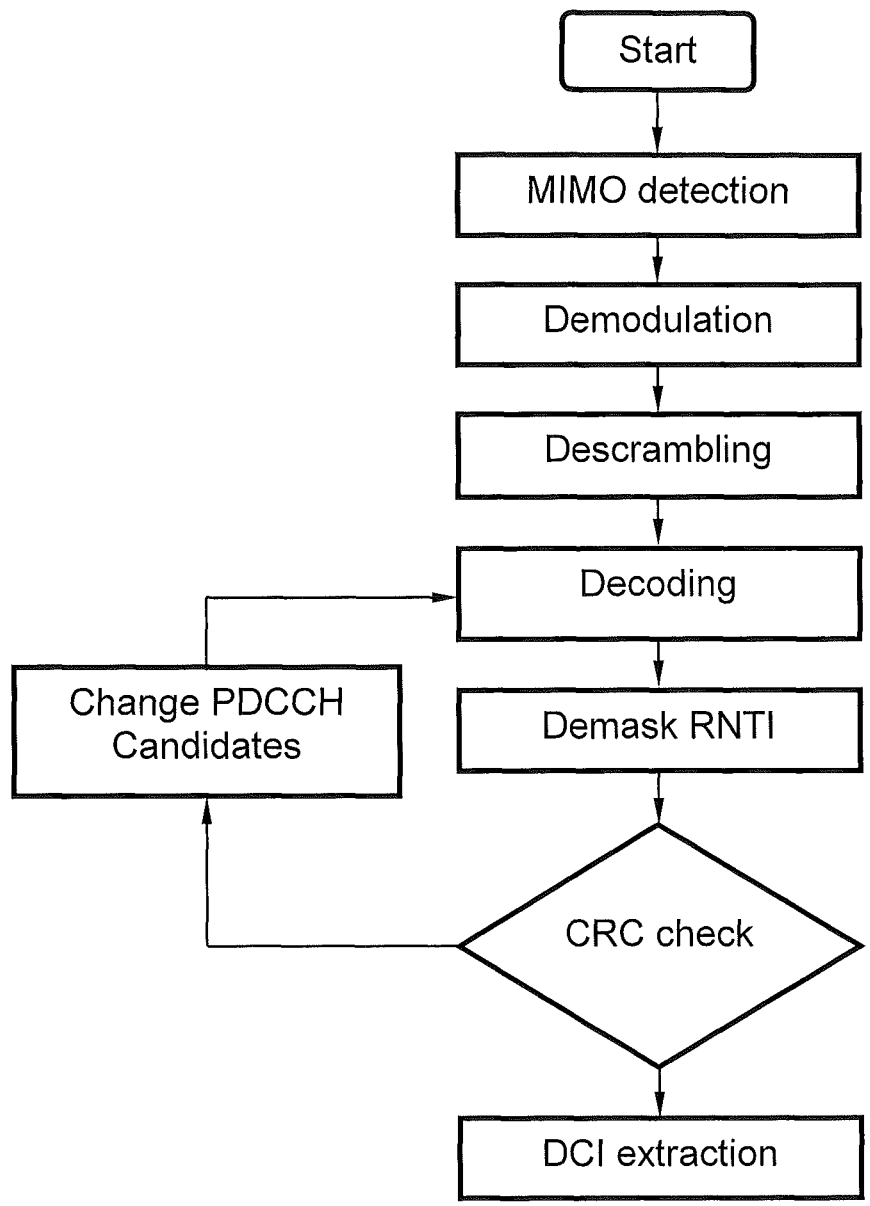
FIG. 1 is a schematic block diagram illustrating a method for detecting PDCCH in LTE according to prior art.
Figure 2:
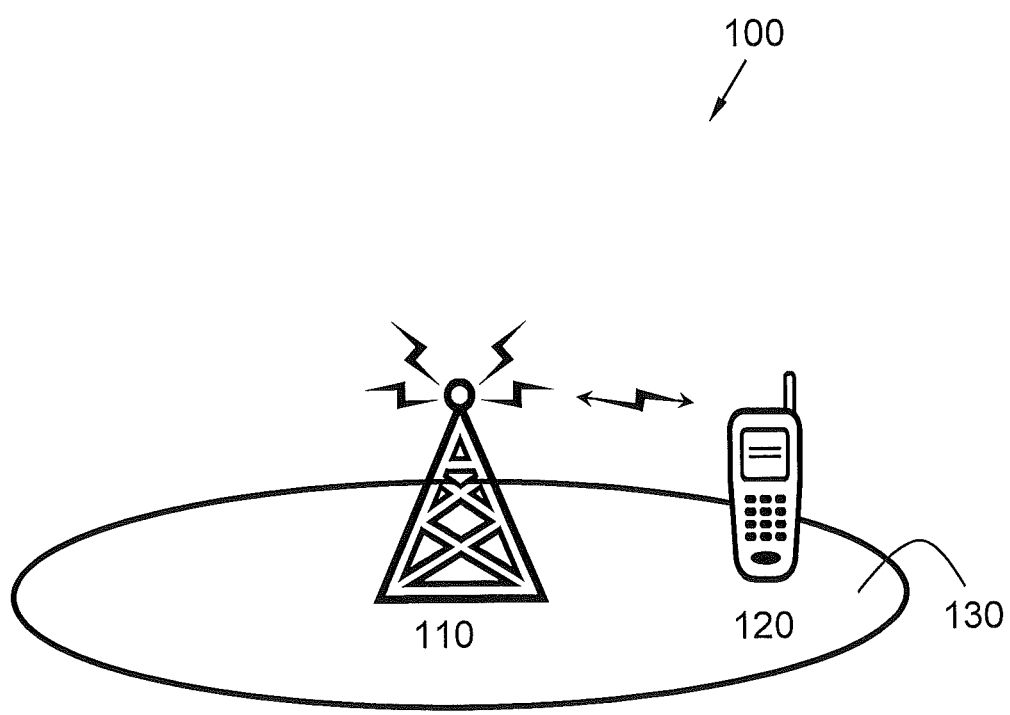
FIG. 2 is an illustration depicting an exemplary communication system according to some embodiments.

FIG. 2 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 2 is to provide a simplified, general overview of the present method and the functionalities involved. The present methods and nodes will as a non-limiting example be described in a 3GPP/LTE environment comprising an E-UTRA system 100 and will in particular illustrate PDCCH detection in such system 100.

The wireless communication system 100 comprises at least one base station 110, and at least one user equipment 120, configured to communicate with each other. The user equipment 120 is situated in a cell 130, defined by the base station 110. The user equipment 120 is configured to transmit radio signals comprising information data to be received by the base station 110. The user equipment 120 is also configured to receive radio signals comprising information data transmitted by the base station 110.

It is to be noted that the illustrated setting of base station 110 and user equipment 120 in FIG. 2 is to be regarded as a non-limiting exemplary embodiment only. The wireless communication network 100 may comprise any other number and/or combination of base stations 110 and or user equipment units 120, although only one instance of a base station 110 and user equipment 120, respectively are illustrated in FIG. 2 for clarity reasons, a plurality of base stations 110 and/or user equipment units 120 may be involved in the present method.

Thus whenever "one" or "a/an" base station 110 and/or user equipment 120 is referred to in the subsequent disclosure, a plurality of base stations 110 and/or user equipment units 120 may be involved.

The base station 110 may be referred to as e.g. network node, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the user equipment 120 over a wireless interface, depending e.g. of the radio access technology and terminology used. In the rest of the disclosure, the term "base station" will be used for the base station 110, in order to facilitate the comprehension of the present methods.

The user equipment 120 may be represented by e.g. a wireless communication terminal, a mobile cellular phone, a Personal Digital Assistant (PDA), a wireless platform, a mobile station, a portable communication device, a laptop, a computer or any other kind of device configured to communicate wirelessly with the base station 110.

The base station 110 controls the radio resource management within the cell 130, such as e.g. allocating radio resources to the user equipment units 120 within the cell 130 and ensuring reliable wireless communication links between the base station 110 and the user equipment 120.

Embodiments of the present methods and arrangements in the user equipment 120 provides a scheme for control channel detection, such as e.g. PDCCH detection, which is faster than previously utilized methods, as multiple decision criteria are used to filter PDCCH candidates. The first decision criterion is power criterion, the second criterion is the mean soft information of descrambling sequence, and the last criterion is the CRC criterion. With the first criterion, the CCEs with no power allocation will be filtered out. With the second criterion, the CCEs carrying <NIL> elements may be eliminated. Whether the <NIL> elements are transmitted and how to transmit them is however not specified, it is vendor specific solution. If the <NIL> elements are not transmitted, the second criterion may be comprised in alternative embodiments. Based on the enumerated filtering criteria, blind detection times are reduced significantly. It reduces the channel detection complexity and save the detection power of the user equipment 120.

Some non-limiting exemplary embodiments will now be further described.

The control region of a control channel, such as e.g. PDCCH, comprises a set of channel elements, such as e.g. Control Channel Elements (CCEs).

For PDCCH transmission, only partial CCEs are used for information data transmission in practical wireless communication systems 100. For unused CCEs, it is not clearly specified how to transmit. In general, there are two ways to handle the unused CCEs. In the first way, no power is allocated in these CCEs. In the second way, data is transmitted in these CCEs, but the information bits are zero. Thus the present method for channel detection is flexible and adaptable in order not to conflict with the present standards and to be adopted by different vendors.

Embodiments of the present method aims at reducing the complexity of the PDCCH blind detection, and the method and user equipment 120 may deal with both of the PDCCH configurations above.

Figure 3:
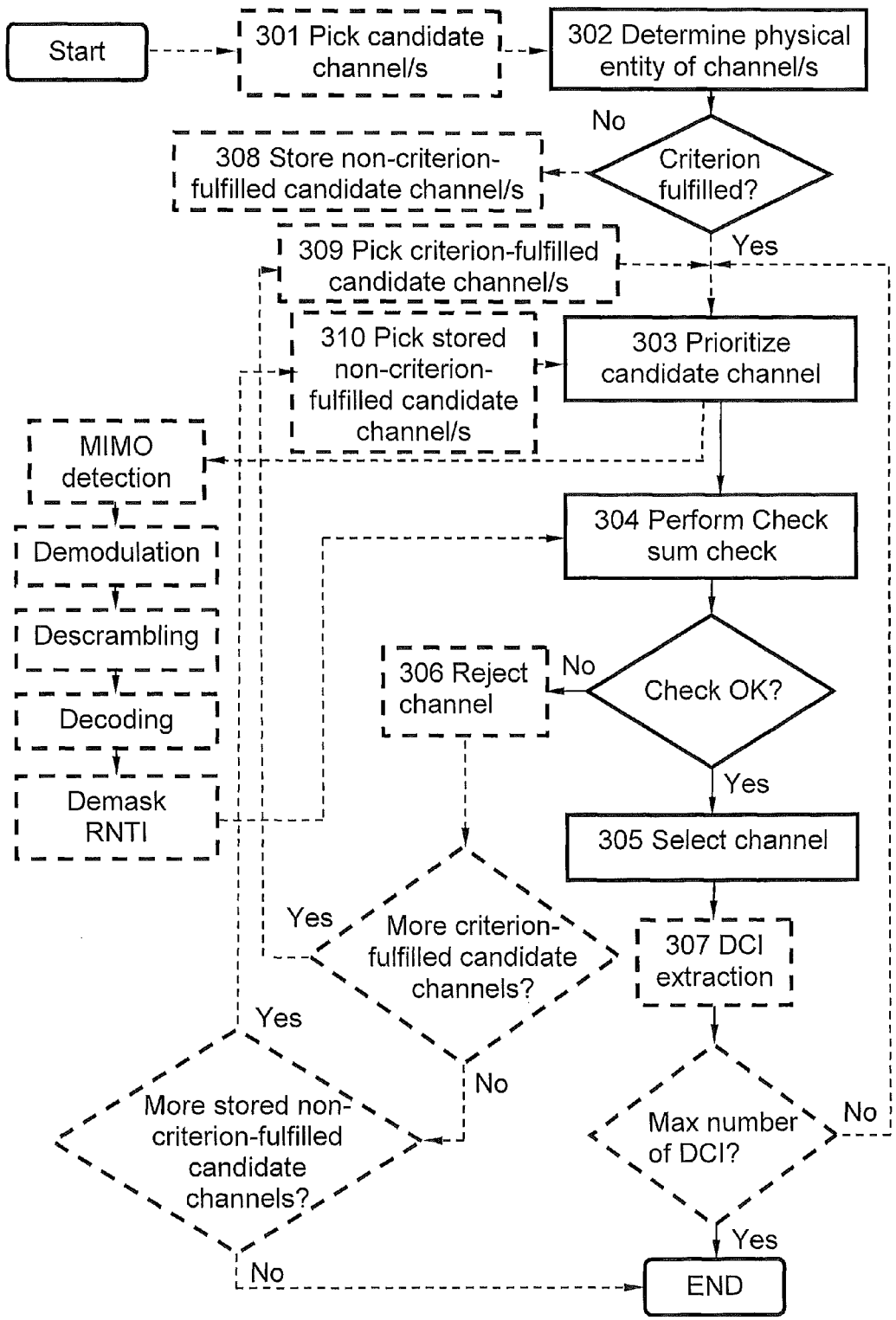
FIG. 3 is a schematic block diagram illustrating an exemplary embodiment of the present method in a user equipment.

Making use of these properties, embodiments of the PDCCH detection method may be changed into the procedure, which is outlined in FIG. 3. In the procedure, three criteria may be used to filter out PDCCH candidates. The first criterion is power criterion, the second criterion is the mean soft information of descrambling sequence, and the last one is the CRC criterion, or check value comparison.

In the first action, implementing the first criterion above, the user equipment 120 may down select PDCCH candidates with power criterion. In this action, the user equipment 120 may calculate the power p (k=0, . . . , N−1) for each CCE, where N is the number of CCE in the PDCCH control region. If the unused CCEs are handled in the first way, the power p in the unused CCEs may be lower, or just the power of noise and interference. As a result, the CCEs with small p may thus not be considered, i.e. filtered out in the following actions. In other words, when p is greater than a first threshold T1, which threshold may be predefined or configurable, the kth CCE may be selected as one candidate for the next action, otherwise, user equipment 120 may not consider these CCEs in the following actions. These selected CCEs are defined as selected CCE subset and the candidate number may be assumed to be N.

In the second action, the PDCCH candidates may be further filtered out from the selected CCE subset based on the mean soft information of descrambled sequence, according to some embodiments. After the first action, if there still are multiple possible PDCCH candidates, descrambling of the corresponding demodulation symbols may continue according to some embodiments. For each CCE, the mean of the soft information $\bar{I}$(k=0, . . . , N−1) of the bits may be calculated according to some embodiments. To be specific, the soft information may be defined as $$\bar{I} = r(2c-1)$$

where r is the imaginary or real part of normalized demodulation symbols corresponding to the jth bit in the kthCCE, and c is the corresponding scrambling sequence. If the CCEs carry no valid PDCCH channel and the unused CCEs are handled in the second way, the soft information may be close to −1. Otherwise, the mean value of the soft information may be larger than −1. Hence, a second threshold T2 may be set. The second threshold T2 may be pre-set, or configurable according to different embodiments. When the mean of the soft information is larger than the threshold T2, PDCCH may be present in the corresponding CCE. Otherwise, it may be considered that no PDCCH is available in the corresponding CCE. Thus the CCE and corresponding channel, such as e.g. PDCCH may not be considered further in the next action.

FIG. 3 is a flow chart illustrating embodiments of a method in a user equipment 120. The method aims at selecting a radio channel out of a plurality of candidate radio channels, which selected radio channel is to be utilized for receiving control information from a base station 110. The user equipment 120 and the base station 110 are comprised in a wireless communication system 100. The radio channel may be a control channel such as e.g. a Physical Downlink Control Channel (PDCCH).

The wireless communication system 100 may be a 3GPP/LTE E-UTRA system. Each candidate radio channel comprises at least one channel element, which may be a control channel element.

To appropriately select a radio channel out of a plurality of candidate radio channels, the method may comprise a number of actions 301-310. It is however to be noted that some of the described actions, e.g. action 301-310 may be performed in a somewhat different chronological order than the enumeration indicates and that some of them, e.g. action 301 and 306-310, may be performed within some alternative embodiments. Further, any, some or all actions, such as e.g. 303 and 304 may be performed simultaneously or in a rearranged chronological order. The method may comprise the following actions:

Action 301

This action may be performed within some alternative embodiments.

A candidate channel, or according to some embodiments, a plurality of candidate channels is/are picked out of the plurality of radio channels, which channels are selectable.

Action 302

A physical entity of a signal is determined. The signal is received from the base station 110 over a candidate radio channel, out of the plurality of candidate radio channels.

The physical entity to be determined may comprise: received power of the signal received over the candidate radio channel and/or a value of data comprised in a channel element of the candidate radio channel, according to some embodiments.

Thus the user equipment 120 may measure the received power of a signal received over a candidate radio channel from the base station 110. The measuring of the received power may comprise calculating the received power of each channel element comprised in the candidate radio channel, according to some embodiments.

Each candidate radio channel may comprise at least one channel element, according to some embodiments. The physical entity to be determined may according to some embodiments comprise the received power of each channel element that may be comprised in the candidate radio channel.

Further, determining the value of data may comprise calculating the mean of the soft information of the channel element data, according to some embodiments.

However, according to some embodiments, the physical entity to be determined may comprise: the received power of all candidate radio channels and/or the value of data comprised in the channel element of all the candidate radio channels.

Thus, according to those embodiments, the received power of all candidate radio channels and/or the value of data comprised in the channel element of all the candidate radio channels may be measured and sorted e.g. in a list of candidate channels, depending on the determined received power and/or the value of data comprised in the channel element of all the candidate radio channels, respectively.

Action 303

If the determined physical entity of a certain candidate radio channel fulfils a criterion, that candidate radio channel is prioritized for a check sum check.

The criterion to be fulfilled may comprise comparing the received power with a first threshold value, and/or comparing the determined value of data with a second threshold value, according to some embodiments. Further, the candidate radio channel may be prioritized if the received power exceeds the first threshold value and/or if the determined value of data exceeds the second threshold value, according to some embodiments.

By prioritizing the channel element and corresponding channel with a high received power, i.e. higher than the first threshold value, the number of candidate channels may be filtered out from further computation actions. Thereby is time saved, and less energy resources are spent on computations performed on candidate radio channels, and the valid radio channel may be selected faster.

The user equipment 120 may compare the calculated value of data with a second threshold value, according to some embodiments, which second threshold value may be comprised within the above mentioned criterion. The second threshold value may be a predefined or configurable value, according to different embodiments.

However, according to some embodiments, the physical entity to be determined may comprise: the received power of all candidate radio channels and/or the value of data comprised in the channel element of all the candidate radio channels. Thus, according to those embodiments, the received power of all candidate radio channels and/or the value of data comprised in the channel element of all the candidate radio channels may be measured and sorted e.g. in a list of candidate channels, depending on the determined received power and/or the value of data comprised in the channel element of all the candidate radio channels, respectively. The criterion to be fulfilled may thus according to some embodiments comprise comparing the received power of all candidate radio channels with each other and/or comparing the values of data comprised in the channel elements of all the candidate radio channels with each other.

The candidate radio channel which has the highest received power and/or the highest value of data, may then be prioritized, according to some embodiments, wherein the received power of all candidate radio channels and/or the values of data comprised in the channel elements of all the candidate radio channels are compared with each other.

Further the method may comprise the following actions to be performed: detecting of Multiple-Input, Multiple-Output, MIMO, demodulating data comprised in the received channel elements comprised in the candidate radio channel, descrambling the demodulated data, decoding descrambled data, demasking decoded data using Radio Network Temporary Identifier, RNTI, according to some embodiments.

However, if the criterion is not fulfilled, the candidate channel may be temporarily stored among non-criterion-fulfilled candidate channels, which is further discussed and explained in more detail in conjunction with action 308.

Action 304

A check sum check is performed on data received over the prioritized candidate radio channel. The check sum check may comprise extracting a check sum value from data received over the prioritised candidate radio channel, calculating a check sum based on the received data, and comparing the extracted check sum value with the calculated check sum. The check sum check may be considered successful when the calculated check sum corresponds to the extracted check sum value, when comparing them. Otherwise, the check sum check may be considered unsuccessful.

The calculation of the check sum may be performed by applying a hash algorithm over the data, thereby extracting the check sum from the received data. For example may a Cyclic Redundancy Check (CRC) be performed, according to some embodiments. However, any other appropriate algorithm such as e.g. a polynomial code checksum or a hash function may be utilized.

Action 305
The user equipment 120 selects the prioritized candidate radio channel, if the check sum check is successful.

Action 306
This action may be performed within some alternative embodiments.

The user equipment 120 may reject the candidate radio channel, if the check sum check is unsuccessful. Another candidate radio channel, which has not been rejected, may then be selected according to some embodiments, e.g. in an iterative way. If there are no more candidate radio channels to select, a selection may be made from temporarily stored channel candidates, which has not fulfilled the criterion, according to some embodiments. Further, the rejected channel may be removed from any temporarily stored list comprising candidate channels on which it may has been temporarily stored, according to some embodiments.

Action 307
This action may be performed within some alternative embodiments.

Downlink Control Information (DCI) may be extracted from the selected channel for candidate channels that has been selected in action 305. Further, according to some embodiments, a check may be made if a maximum number of DCI have been discovered. The maximum number of DCIs may in a non-limiting example be e.g. two, according to some embodiments. If the maximum number of DCI has been discovered, the method may terminate. Otherwise, the method may be performed iteratively for different candidate radio channels until a maximum number of radio channels have been selected, or until the method has been performed on all selectable candidate radio channels.

Action 308
This action may be performed within some alternative embodiments.

Any candidate radio channel which has not fulfilled the criterion and/or been prioritized may be temporarily stored in a reservoir of non-criterion-fulfilled candidate radio channels, if the determined physical entity does not fulfil the above mentioned criterion, according to some embodiments. These temporarily stored non-criterion-fulfilled candidate radio channels may thus be processed and be subject to a check sum check e.g. in an arbitrary order, according to some embodiments. This further processing of any, some or all temporarily stored non-criterion-fulfilled candidate radio channels may be performed for increased robustness of the method, for discovering a valid candidate channel also the cases where the measured received power, and/or mean soft value, is lower than their respective thresholds, due to e.g. interference and/or fading issues.

Action 309
This action may be performed within some alternative embodiments.

A selection may be made from temporarily stored channel candidates, which has fulfilled the criterion, according to some embodiments. This may be performed in an iterative way until all selectable channel candidates have been checked, or until the maximum number of channels has been detected.

Action 310
This action may be performed within some alternative embodiments.

If there are no more candidate radio channels to select, and/or no more temporarily stored channel candidates, which has fulfilled the criterion, a selection may be made from temporarily stored channel candidates, which has not fulfilled the criterion, according to some embodiments. Thus the non-prioritized candidate channels may be reconsidered, if no valid channel candidates are detected according to any of the above described actions. This may be performed in an iterative way until all selectable channel candidates have been checked, or until the maximum number of channels has been detected. Thereby is an increased robustness of the present method achieved.

It is to be noted that the method may be performed iteratively for different candidate radio channels out of the plurality of candidate radio channels, until a radio channel has been selected 305, or until the method has been performed on all selectable candidate radio channels according to some embodiments. Further, according to some embodiments, the action of performing 304 the check sum check may be performed 310 for the temporarily stored channel candidates, which has not fulfilled the criterion, according to some embodiments.

Some alternative embodiments may thus comprise further improvements for enhanced robustness. Since, in some cases, the candidate channels, such as e.g. candidate PDCCH, may be valid although it's measured received power, or mean soft value, is lower than the respective thresholds. This may be due to e.g. interference and fading issue.

In order to avoid such issue, reducing the risk of missing some valuable candidate channels, two ways may be taken to increase the robustness of the present method, according to different embodiments. The first alternative embodiment for enhancing robustness may be to reconsider the non-criterion-fulfilled candidate channels, if no valid channel candidates are detected with the above procedure previously described. The non-criterion-fulfilled candidates may then be reconsidered and check sum checked. Thereby may the proposed algorithm be enhanced from a robustness perspective, while the detection complexity reduction properties may be kept. In one subframe, at most two PDCCHs for C-RNTI may be present according to some non-limiting embodiments, one for downlink and the other for uplink. If two valid candidate channels, or valid PDCCHs, are detected, the present method may be terminated according to some embodiments. The detection procedure may be terminated in the "un-rejected" part according to some embodiments. Hence, the checking in the rejected part may not always be executed. As a result, the complexity is reduced if valid candidate channels are transmitted in the corresponding subframe.

The second alternative embodiment for enhancing robustness may comprise to sort the candidate channels according to power criterion and/or mean soft value criterion in each step. The candidate channels associated with higher received power and/or mean soft value may be prioritized for checking. In this way, no threshold value may be needed according to those embodiments, and no channel candidates may have to be rejected. Thus the robustness may be enhanced while the complexity may be kept low, which renders an improved method.

Figure 4:
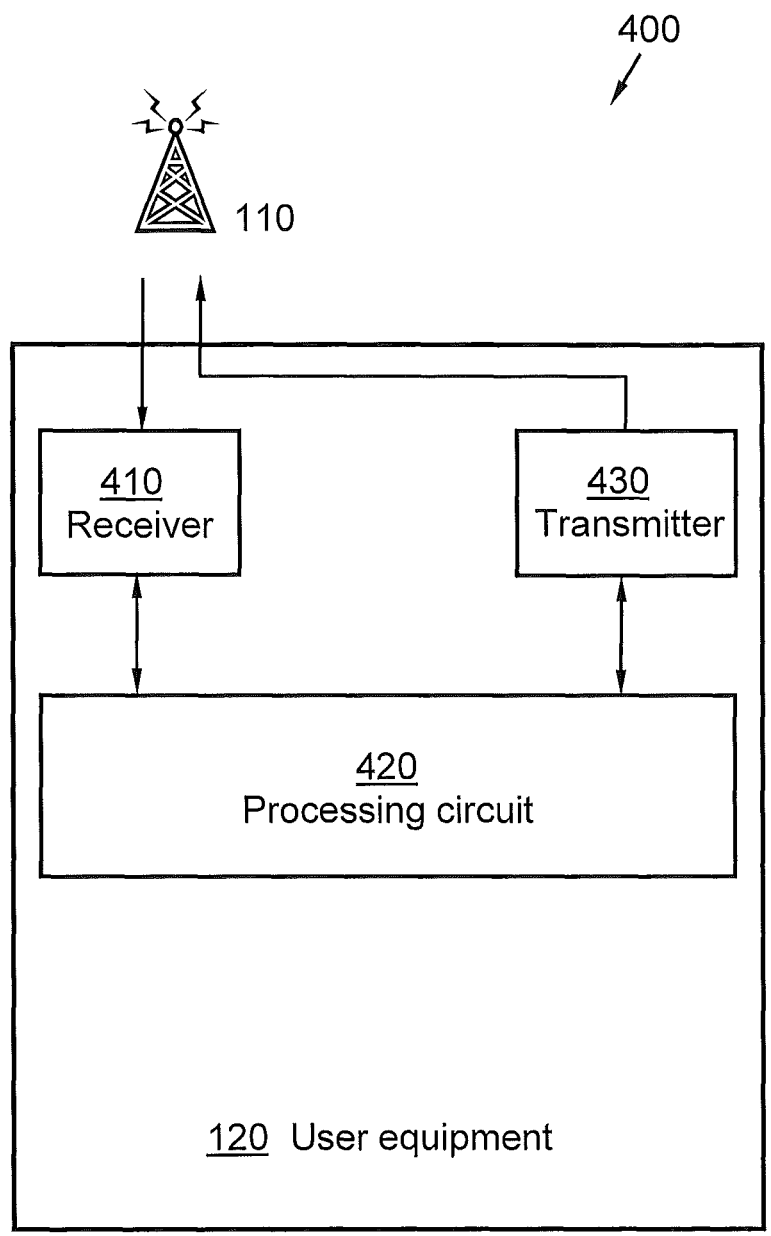
FIG. 4 is a schematic block diagram illustrating an exemplary embodiment of the present user equipment.

FIG. 4 is a block diagram illustrating an arrangement 400 in a user equipment 120. The user equipment 120 may be represented by a mobile station or the like, according to some embodiments. The user equipment 120 is configured to perform any, some or all of the actions 301-310 for selecting a radio channel out of a plurality of candidate radio channels, which selected radio channel is to be utilized for receiving control information from a base station 110. The user equipment 120 and the base station 110 are comprised in a wireless communication system 100. The radio channel to be selected out of a plurality of candidate radio channels may be a control channel such as e.g. a Physical Downlink Control Channel (PDCCH) and wherein the channel element is a control channel element.

The wireless communication system 100 may be a 3GPP/LTE E-UTRA system. Each candidate radio channel may comprise at least one channel element, which may be a control channel element.

For the sake of clarity, any internal electronics or other components of the user equipment 120, not completely indispensable for understanding the present method has been omitted from FIG. 4.

In order to perform the actions 301-310 correctly, the arrangement 400 in the user equipment 120 comprises a receiver 410. The receiver 410 is configured to receive signals over a candidate radio channel from the base station 110.

Further, the arrangement 400 comprises a processing circuit 420. The processing circuit 420 is configured to determine a physical entity of a signal received from the base station 110 over a candidate radio channel, out of the plurality of candidate radio channels. Further, the processing circuit 420 is also configured to prioritize the candidate radio channel for a check sum check, if the determined physical entity fulfils a criterion. Additionally, the processing circuit 420 is also configured to perform the check sum check on data received over the prioritized candidate radio channel. Furthermore, the processing circuit 420 is also configured to select the prioritized candidate radio channel, if the check sum check is successful.

The processing circuit 420 may also be further configured to reject the candidate radio channel, if the check sum check is unsuccessful, according to some embodiments.

In further addition, the processing circuit 420 may also be configured to measure the received power of a signal received over a candidate radio channel from the base station 110, according to some embodiments. The processing circuit 420 may be further configured to compare the received power with a first threshold value. In addition, the processing circuit 420 may be further configured to reject the candidate radio channel, if the received power is lower than the first threshold value. Furthermore, the processing circuit 420 may be additionally configured to extract a check sum value from data received over the candidate radio channel according to some embodiments. Also, in addition, the processing circuit 420 may in addition also be configured to calculate a check sum based on the received data. The processing circuit 420 may according to some embodiments be furthermore configured to select the radio channel, if the calculated check sum corresponds to the check sum value, and otherwise to reject the candidate radio channel.

The processing circuit 420 may in addition also be configured to calculate the value of data comprised in the channel element of the candidate radio channel, according to some embodiments. Further, the processing circuit 420 may also be configured to compare the calculated value with a second threshold value, according to some embodiments.

The processing circuit 420 may in addition also be configured to perform any, some or all of: detecting MIMO, demodulating data comprised in the received channel elements comprised in the candidate radio channel, descrambling the demodulated data, decoding descrambled data and/or demasking decoded data using RNTI.

Furthermore, the processing circuit 420 may in addition be further configured to select another candidate radio channel, which has not been rejected, if the calculated check sum does not correspond to the check sum value, according to some embodiments. The processing circuit 420 may further be configured to select another candidate radio channel from temporarily stored channel candidates, which has fulfilled the criterion, according to some embodiments. In addition, the processing circuit 420 may be further configured to select another candidate radio channel from temporarily stored channel candidates, which has not fulfilled the criterion, according to some embodiments. This may be performed in an iterative way until all selectable channel candidates have been checked, or until the maximum number of channels has been detected.

The processing circuit 420 may comprise e.g. one or more instances of a Central Processing Unit (CPU), a processing unit, a processor, a microprocessor, or other processing logic that may interpret and execute instructions. The processing circuit 420 may further perform data processing functions for inputting, outputting, and processing of data comprising data buffering and device control functions, such as call processing control, user interface control, or the like.

In addition, the arrangement 400 may comprise a transmitter 430 according to some embodiments. The transmitter 430 may be arranged to transmit signals to the base station 110, such as e.g. transmit uplink signalling to the base station 110, according to some embodiments.

Further, it is to be noted that some of the described units 410-430 comprised within the arrangement 400 in the user equipment 120 in the wireless communication system 100 are to be regarded as separate logical entities but not with necessity separate physical entities. To mention just one example, the receiver 410 and the transmitter 430 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110, and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The described actions 301-310 to be performed in the user equipment 120 may be implemented through one or more processing circuits 420 in the user equipment 120, together with computer program code for performing the functions of the present actions 301-310. Thus a computer program product, comprising instructions for performing the actions 301-310 in the user equipment 110 may select a radio channel out of a plurality of candidate radio channels, which selected radio channel is to be utilized for receiving control information from a base station 110, when being loaded into the one or more processing circuits 420. Those instructions, or program code, executable by the one or more processing circuits 420 may be disclosed specifically as resident on a non-transitory computer readable medium.

The computer program product mentioned above may be provided for instance in the form of a data carrier carrying computer program code for performing at least some of the actions 301-310 according to some embodiments when being loaded into the processing circuit 420. The data carrier may be e.g. a hard disk, a CD ROM disc, a memory stick, an optical storage device, a magnetic storage device or any other appropriate medium such as a disk or tape that may hold machine readable data.

The computer program product may furthermore be provided as computer program code on a server and downloaded to the user equipment 110 remotely, e.g. over an Internet or an intranet connection.

Figure 5:
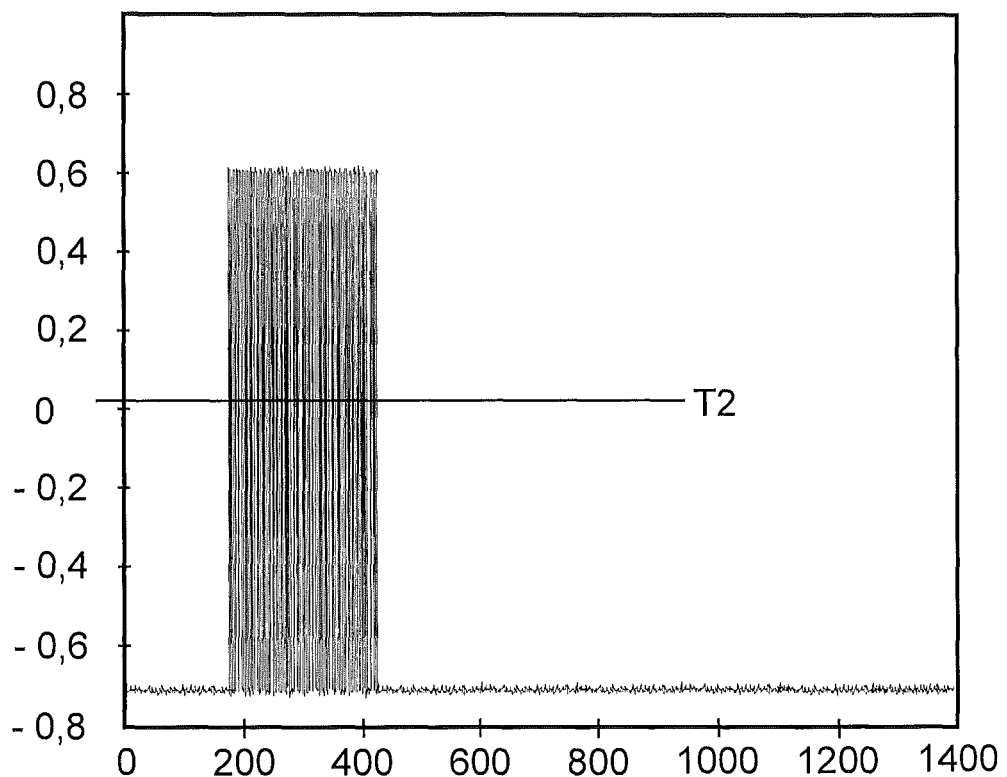
FIG. 5 is a diagram illustrating an exemplary embodiment comprising soft information value according to some embodiments of the present method.

FIG. 5 illustrates an exemplary embodiment, clarifying the action 303 in the particular embodiment wherein the criterion comprises comparing the calculated value of data with the second threshold value T2. The second threshold value T2 may be a predefined or configurable value, according to different embodiments. The calculated value of data may comprise calculating the mean soft information of descrambling sequence. In the illustrated example is there a soft information value of descrambled sequence, where one valid candidate channel is present in the control region. From FIG. 5, is there illustrated that the mean soft information is higher than the second threshold value T2 when the candidate channel is present at the corresponding CCEs. Otherwise, the mean soft information is lower than the second threshold value T2. When few candidate channels are present in the control region, the maximum blind detection times may be considerably reduced in comparison with known solutions, according to some embodiments.

With the above actions, unused CCEs may be filtered out according to the present method i.e. the previously described criterion, if the unused CCEs are handled in the first way, and the unused CCEs may be removed, if the unused CCEs are dealt with in the second way. Hence, in a subsequent action, only few candidate channels may be considered for the decoding, demasking, and check sum checking, as the other candidate channels may be filtered out. Therefore, the number of blind detection times and also the MIMO detection load may be reduced, which may further result in a complexity reduction. Furthermore, the descrambling action may not increase any complexity to the present method.

Additionally, the check sum checking is used to finalize the decision of the selected candidate channels. In this action, the descrambled sequence may be decoded, demasked and checked with a check sum, such as e.g. CRC, to see whether the candidate channel is valid to the corresponding user equipment 120. If the channel candidate, such as e.g. PDCCH candidate, is not a valid candidate channel, a new candidate channel may be selected from the subset down-selected, and repeat the actions of decoding, demasking and/or check sum checking, until either all the valid candidate channels has been detected, or all candidate channels have been checked.

Figure 6:
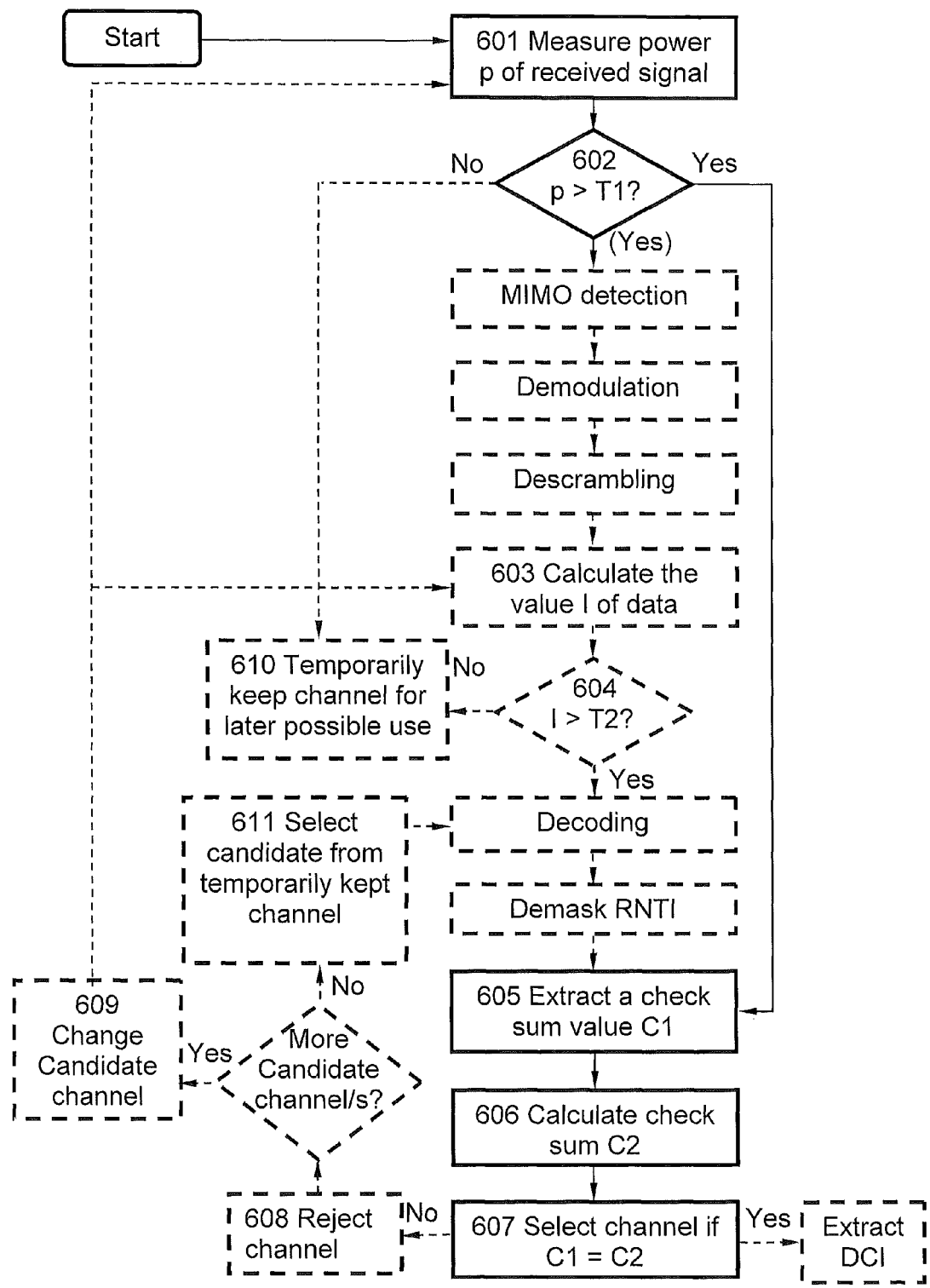
FIG. 6 is a schematic block diagram illustrating an exemplary embodiment of the present method in a user equipment.

FIG. 6 is a flow chart illustrating an alternative embodiment of a method in a user equipment 120. The method aims at selecting a radio channel out of a plurality of candidate radio channels, which selected radio channel is to be utilized for receiving control information from a base station 110. The user equipment 120 and the base station 110 are comprised in a wireless communication system 100. The radio channel may be a control channel such as e.g. a Physical Downlink Control Channel (PDCCH).

The wireless communication system 100 may be a 3GPP/LTE E-UTRA system. Each candidate radio channel comprises at least one channel element, which may be a control channel element.

To appropriately select a radio channel out of a plurality of candidate radio channels, the method may comprise a number of actions 601-611.

It is however to be noted that some of the described actions, e.g. action 601-611 may be performed in a somewhat different chronological order than the enumeration indicates and that some of them, e.g. action 603, 604 and 608-611, may be performed within some alternative embodiments. Further, any, some or all actions, such as e.g. 605 and 606 may be performed simultaneously or in a rearranged chronological order. The method may comprise the following actions:

Action 601

The user equipment 120 measure the received power p of a signal received over a candidate radio channel from the base station 110. The measuring of the received power p may comprise calculating the received power p of each channel element comprised in the candidate radio channel, according to some embodiments.

Action 602

The user equipment 120 compares the received power p with a first threshold value T1. The first threshold value T1 may be a predefined or configurable value.

If the received power p is lower than the first threshold value T1, the channel element and corresponding channel may be rejected according to some embodiments. Instead of rejecting the candidate channel for which the received power p is lower than the first threshold value T1, may these candidate channel be non-prioritised and temporarily kept for later possible use, which is further described and discussed under action 610.

By rejecting, or temporarily keep the candidate channel for later possible use, the channel element and corresponding channel with a low received power, i.e. smaller than the first threshold value T1, the number of candidate channels may be filtered out from further computation actions. Thereby is time saved, and less energy resources are spent on computations performed on candidate radio channels, and the valid radio channel may be selected faster.

Further the method may comprise the following actions to be performed if the received power is bigger than the first threshold value: detecting of Multiple-Input, Multiple-Output, MIMO, demodulating data comprised in the received channel elements comprised in the candidate radio channel, descrambling the demodulated data, decoding descrambled data, demasking decoded data using Radio Network Temporary Identifier, RNTI, according to some embodiments.

Action 603

This action may be performed within some alternative embodiments. The user equipment 120 may calculate the value of data I comprised in the channel element of the candidate radio channel, according to some embodiments. The calculated value of data I may be compared with a second threshold value T2. The second threshold value T2 may be a predefined or configurable value. The calculation of the value of data may comprise calculating the mean of the soft information of the channel element data.

Action 604

This action may be performed within some alternative embodiments.

The user equipment 120 may compare the calculated value I with a second threshold value T2, according to some embodiments. The second threshold value T2 may be a predefined or configurable value, according to different embodiments.

If the calculated value of data I is higher than the second threshold value T2, the data associated with the candidate channel may according to some embodiment be decoded and demasked according to some embodiments.

If the calculated value of data I is lower than the second threshold value T2, the channel element and corresponding channel may be rejected according to some embodiments. Instead of rejecting the candidate channel for which the value of data I is lower than the second threshold value T2, may these candidate channel be non-prioritised and temporarily kept for later possible use, which is further described and discussed under action 610.

By rejecting, or temporarily keep the candidate channel for later possible use, the channel element and corresponding channel with value of data I, lower than the second threshold value T2, the number of candidate channels may be filtered out from further computation actions. Thereby is time saved, and less energy resources are spent on computations performed on candidate radio channels, and the valid radio channel may be selected faster.

Action 605

The user equipment 120 may extract a check sum value C1 from data received over the candidate radio channel. The check sum value C1 may be based on the Cyclic Redundancy Check (CRC) algorithm according to some embodiments. However, any other appropriate algorithm may be utilized.

Action 606

The user equipment 120 may calculate a check sum C2 based on the received data.

The calculation of the check sum C2 may be performed by applying a hash algorithm over the data, thereby extracting the check sum from the received data. For example may a Cyclic Redundancy Check (CRC) be performed.

Action 607

The user equipment 120 may select the candidate radio channel, if the calculated check sum C2 corresponds to the check sum value C1. If the calculated check sum C2 does correspond to the check sum value C1 the candidate radio channel is selected. Further, downlink control information (DCI) may be extracted.

Otherwise, according to some embodiments, may the candidate radio channel be rejected as further discussed under action 608. Further, another candidate radio channel, which has not been rejected, may be selected according to some embodiments, which is further discussed under action 609.

Action 608

This action may be performed within some alternative embodiments.

The user equipment 120 rejects the candidate radio channel, if the calculated check sum does not correspond to the check sum value. Thereby may the rejected candidate radio channel be erased from further processing of the actions comprised in the method.

Action 609

This action may be performed within some alternative embodiments.

Yet a candidate channel may be picked for measuring the power of a signal received over the candidate channel.

Action 610

This action may be performed within some alternative embodiments.

The candidate channels, which do not pass the respective filtering tests performed in actions 602 and 604 may be temporarily kept for later possible use.

Action 611

This action may be performed within some alternative embodiments.

Another candidate channel may then be selected from the temporarily kept channels, according to some embodiments. It is to be noted that the method may be performed iteratively for different candidate radio channels out of the plurality of candidate radio channels, until a valid radio channel has been selected 607, or until the method has been performed on all selectable candidate radio channels according to some embodiments. Further, according to some embodiments may the actions of extracting 605 the check sum value, calculating 606 the check sum and selecting 607 the radio channel, if the calculated check sum corresponds to the check sum value be performed for the rejected 608 candidate radio channels, according to some embodiments.

Figure 7:
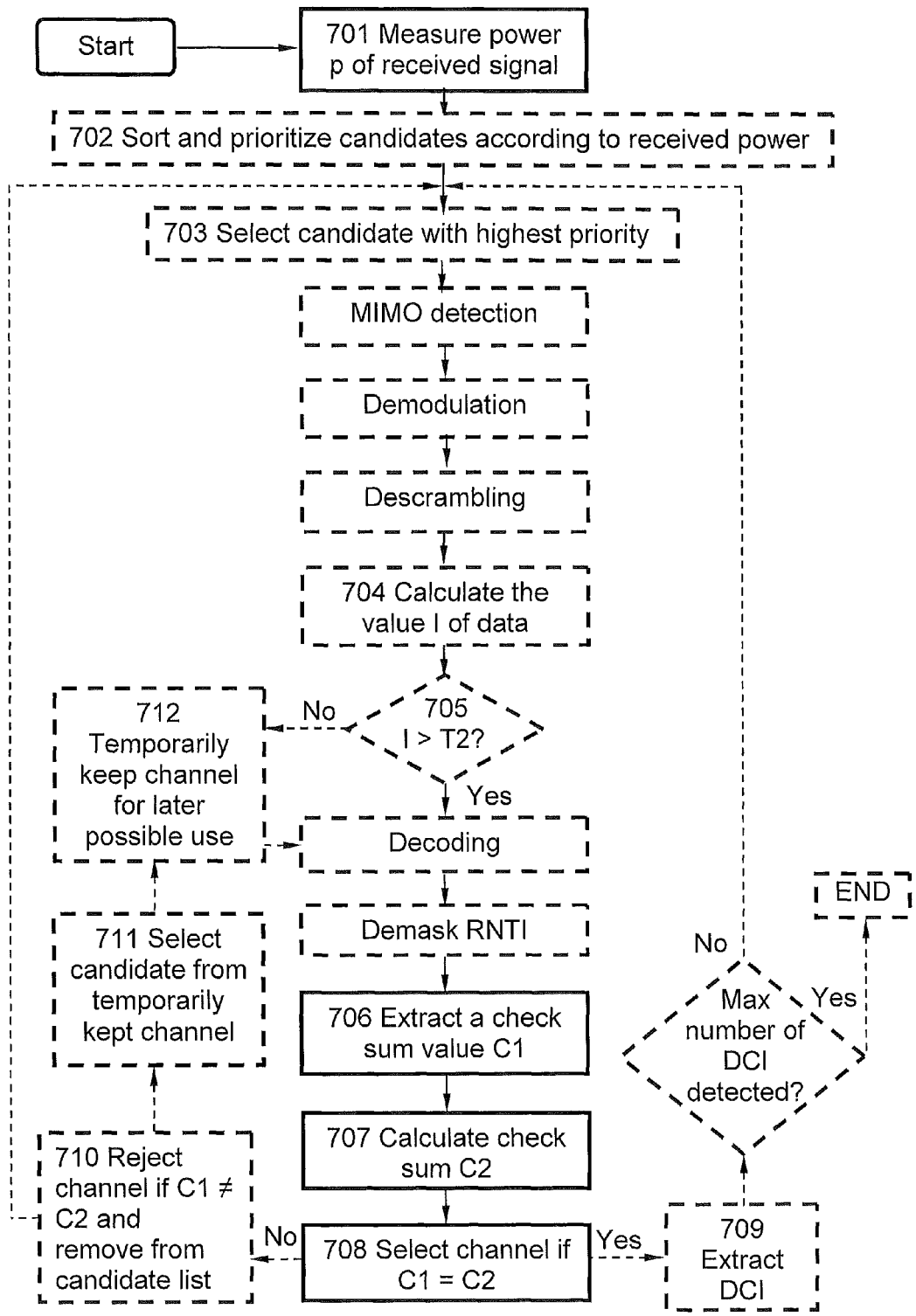
FIG. 7 is a schematic block diagram illustrating an exemplary embodiment of the present method in a user equipment.

FIG. 7 is a flow chart illustrating an alternative embodiment of a method in a user equipment 120. The method aims at selecting a radio channel out of a plurality of candidate radio channels, which selected radio channel is to be utilized for receiving control information from a base station 110. The user equipment 120 and the base station 110 are comprised in a wireless communication system 100. The radio channel may be a control channel such as e.g. a Physical Downlink Control Channel (PDCCH).

The wireless communication system 100 may be a 3GPP/LTE E-UTRA system. Each candidate radio channel comprises at least one channel element, which may be a control channel element.

To appropriately select a radio channel out of a plurality of candidate radio channels, the method may comprise a number of actions 701-712.

It is however to be noted that some of the described actions, e.g. action 701-712 may be performed in a somewhat different chronological order than the enumeration indicates and that some of them, e.g. action 702-705 and 709-712, may be performed within some alternative embodiments. Further, any, some or all actions, such as e.g. 706 and 707 may be performed simultaneously or in a rearranged chronological order. The method may comprise the following actions:

Action 701

The user equipment 120 measure the received power p of a signal received over a plurality of candidate radio channels from the base station 110. The measuring of the received power p may comprise calculating the received power p of each channel element comprised in the candidate radio channels, according to some embodiments.

Action 702

This action may be performed within some alternative embodiments.

The respective candidate radio channels may be sorted in order of magnitude of measured received power p, associated with each respective candidate channel of the plurality of candidate radio channels, received from the base station 110. The candidate radio channel which is associated with the highest measured received power p may be considered prioritized.

Action 703

This action may be performed within some alternative embodiments.

The candidate channel which is prioritized under action 702, as it may be associated with the highest measured received power p, may be selected according to some embodiments.

Further the method may comprise the following actions to be performed according to some embodiments: detecting of Multiple-Input, Multiple-Output, MIMO, demodulating data comprised in the received channel elements comprised in the candidate radio channel and/or descrambling the demodulated data.

Action 704
This action may be performed within some alternative embodiments.

The user equipment 120 may calculate the value of data I comprised in the channel element of the candidate radio channel, according to some embodiments. The calculation of the value of data may comprise calculating the mean of the soft information of the channel element data. The calculated value of data I may further be compared with a second threshold value T2 in action 705. The second threshold value T2 may be a predefined or configurable value.

Action 705
This action may be performed within some alternative embodiments.

The user equipment 120 may compare the calculated value I with a second threshold value T2, according to some embodiments. The second threshold value T2 may be a predefined or configurable value, according to different embodiments.

If the calculated value of data I is higher than the second threshold value T2, the data associated with the candidate channel may according to some embodiment be decoded and demasked according to some embodiments.

If the calculated value of data I is lower than the second threshold value T2, the channel element and corresponding channel may be rejected according to some embodiments. Instead of rejecting the candidate channel for which the value of data I is lower than the second threshold value T2, may these candidate channel be non-prioritised and temporarily kept for later possible use, which is further described and discussed under action 712.

By rejecting, or temporarily keep the candidate channel for later possible use, the channel element and corresponding channel with value of data I, lower than the second threshold value T2, the number of candidate channels may be filtered out from further computation actions. Thereby is time saved, and less energy resources are spent on computations performed on candidate radio channels, and the valid radio channel may be selected faster.

Action 706
The user equipment 120 may extract a check sum value C1 from data received over the candidate radio channel. The check sum value C1 may be based on the Cyclic Redundancy Check (CRC) algorithm according to some embodiments. However, any other appropriate algorithm may be utilized.

Action 707
The user equipment 120 may calculate a check sum C2 based on the received data.

The calculation of the check sum C2 may be performed by applying a hash algorithm over the data, thereby extracting the check sum from the received data. For example may a Cyclic Redundancy Check (CRC) be performed.

Action 708
The user equipment 120 may select the candidate radio channel, if the calculated check sum C2 corresponds to the check sum value C1. If the calculated check sum C2 does correspond to the check sum value C1 the candidate radio channel is selected. Further, Downlink Control Information (DCI) may be extracted in action 709.

Otherwise, according to some embodiments, may the candidate radio channel be rejected as further discussed under action 710. Further, another candidate radio channel, which has not been rejected, may be selected according to some embodiments, which is further discussed under action 711.

Action 709
This action may be performed within some alternative embodiments.

Further, Downlink Control Information (DCI) may be extracted. Also, a check may be performed to check if the maximum number of DCI has been detected. The maximum number of DCI may be predetermined, or preconfigured according to some embodiments. If the maximum number of DCI has been detected, the method may be terminated according to some embodiments.

Action 710
This action may be performed within some alternative embodiments.

The user equipment 120 may reject the candidate radio channel, if the calculated check sum does not correspond to the check sum value. Thereby may the rejected candidate radio channel be erased from further processing of the actions comprised in the method.

Action 711
This action may be performed within some alternative embodiments.

Another candidate channel may be selected from the temporarily kept channels may according to some embodiments be selected.

Action 712
This action may be performed within some alternative embodiments.

The candidate channels, which do not pass the respective filtering tests performed in action 705 may be temporarily kept for later possible use.

It is to be noted that the method may be performed iteratively for different candidate radio channels out of the plurality of candidate radio channels, until a valid radio channel has been selected 708, or until the method has been performed on all selectable candidate radio channels according to some embodiments. Further, according to some embodiments the actions of extracting 706 the check sum value, calculating 707 the check sum and selecting 708 the candidate radio channel may, if the calculated check sum corresponds to the check sum value be performed for the candidate radio channels, that has temporarily kept channel for later possible use, according to some embodiments.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a user equipment for selecting a radio channel out of a plurality of candidate radio channels, which selected radio channel is to be utilized for receiving control information from a base station, the user equipment and the base station are comprised in a wireless communication system, which method comprises:
    determining a physical entity of a signal received from the base station over a candidate radio channel, out of the plurality of candidate radio channels;
    prioritizing the candidate radio channel for performance of a check sum check in response to the determined physical entity satisfying a defined criteria;
    performing the check sum check on data received over the prioritized candidate radio channel;

selecting the prioritized candidate radio channel in response to determining that the check sum check is successful; and rejecting the candidate radio channel in response to determining that the check sum check is unsuccessful.

2. The method according to claim 1, further comprising:
responsive to rejecting the candidate radio channel, iteratively performing the method for different candidate radio channels until a check sum check is determined to be successful or the method has been performed on all selectable candidate radio channels.

3. The method according to claim 1, wherein:
determining the physical entity comprises determining received power of a signal, received over the candidate radio channel; and
prioritizing the candidate radio channel for performance of the check sum check in response to the determined physical entity satisfying the defined criteria comprises:
comparing the received power with a first threshold value; and
prioritizing the candidate radio channel in response to the received power exceeding the first threshold value.

4. The method according to claim 1, wherein:
determining the physical entity to be determined comprises determining a value of data comprised in a channel element of the candidate radio channel; and
prioritizing the candidate radio channel for performance of the check sum check in response to the determined physical entity satisfying the defined criteria comprises:
comparing the determined value of data with a second threshold value; and prioritizing the candidate radio channel in response to the determined value of data exceeding the second threshold value.

5. The method according to claim 4, wherein determining the value of data comprises calculating the mean of soft information of the channel element data, wherein the soft information is based on the received demodulation symbols.

6. The method according to claim 1, wherein each candidate radio channel comprises at least one channel element and wherein determining the physical entity comprises calculating the received power of each channel element comprised in the candidate radio channel.

7. The method according to claim 1, further comprising determining the received power of all candidate radio channels and/or the value of data comprised in the channel element of all the candidate radio channels, and
wherein prioritizing the candidate radio channel for performance of the check sum check in response to the determined physical entity satisfying the defined criteria comprises:
comparing the received power of all candidate radio channels with each other and/or comparing the values of data comprised in the channel elements of all the candidate radio channels with each other; and
prioritizing the candidate radio channel having the highest received power and/or the highest value of data.

8. The method according to claim 1, further comprising temporarily storing any candidate radio channel which is not prioritized in a reservoir of non-prioritised candidate radio channels in response to the determined physical entity not fulfilling the defined criteria.

9. The method according to claim 1, further comprising at least one of the following actions performed for data received on the prioritised candidate radio channel, before performing the check sum check:
descrambling the demodulated data, decoding descrambled data, and
demasking decoded data using Radio Network Temporary Identifier, RNTI.

10. The method according to claim 1, wherein the radio channel to be selected is a Physical Downlink Control Channel, PDCCH, and wherein the channel element is a control channel element.

11. The method according to claim 1, wherein performing the check sum check comprises:
extracting a check sum value from data received over the prioritised candidate radio channel;
calculating a check sum based on the received data; comparing the extracted check sum value with the calculated check sum; and
determining that the check sum check is successful when the calculated check sum corresponds to the extracted check sum value.

12. An arrangement in a user equipment, configured for selecting a radio channel out of a plurality of candidate radio channels, which selected radio channel is to be utilized for receiving control information from a base station, the user equipment and the base station are comprised in a wireless communication system, which arrangement comprises:
a receiver configured to receive signals over a candidate radio channel from the base station; and
a processing circuit configured to:
determine a physical entity of a signal received from the base station over a candidate radio channel, out of the plurality of candidate radio channels:
prioritize the candidate radio channel for performance of a check sum check in response to the determined physical entity satisfying a defined criteria;
perform the check sum check on data received over the prioritized candidate radio channel;
select the prioritized candidate radio channel in response to determining that the check sum check is successful; and
reject the candidate radio channel in response to determining that the check sum check is unsuccessful.

13. The arrangement according to claim 12, wherein the processing circuit is further configured to respond to rejection of the candidate radio channel by iteratively performing the determining, the prioritizing, and one of the selecting and the rejecting for different candidate radio channels until a check sum check is determined to be successful or the method has been performed on all selectable candidate radio channels.

14. The arrangement according to claim 12, wherein the processing circuit is further configured to perform at least one of the following for data received on the prioritised candidate radio channel before performing the check sum check:
descramble the demodulated data,
decode descrambled data, and
demask decoded data using RNTI.

15. The arrangement according to claim 12, wherein the radio channel to be selected out of a plurality of candidate radio channels is a Physical Downlink Control Channel, PDCCH, and wherein the channel element is a control channel element.

16. The arrangement according to claim 12, wherein the processing circuit is further configured to iteratively repeat the determining of the physical entity, prioritizing of the candidate radio channel, and performing the check sum check for different candidate radio channels until a maximum number of radio channels have been selected or all selectable candidate radio channels have been selected.

17. The arrangement according to claim 12, wherein the processing circuit is further configured to:

determine the physical entity in response to determining received power of a signal received over the candidate radio channel;

prioritize the candidate radio channel for performance of the check sum check in response to comparing the received power with a first threshold value, and determining that the received power exceeds the first threshold value.

18. The arrangement according to claim 12, wherein the processing circuit is further configured to:

determine the physical entity in response to determining a value of data comprised in a channel element of the candidate radio channel;

prioritize the candidate radio channel for performance of the check sum check in response to comparing the determined value of data with a second threshold value, and determining that the value of data exceeds the second threshold value.

* * * * *